Patented Feb. 14, 1939

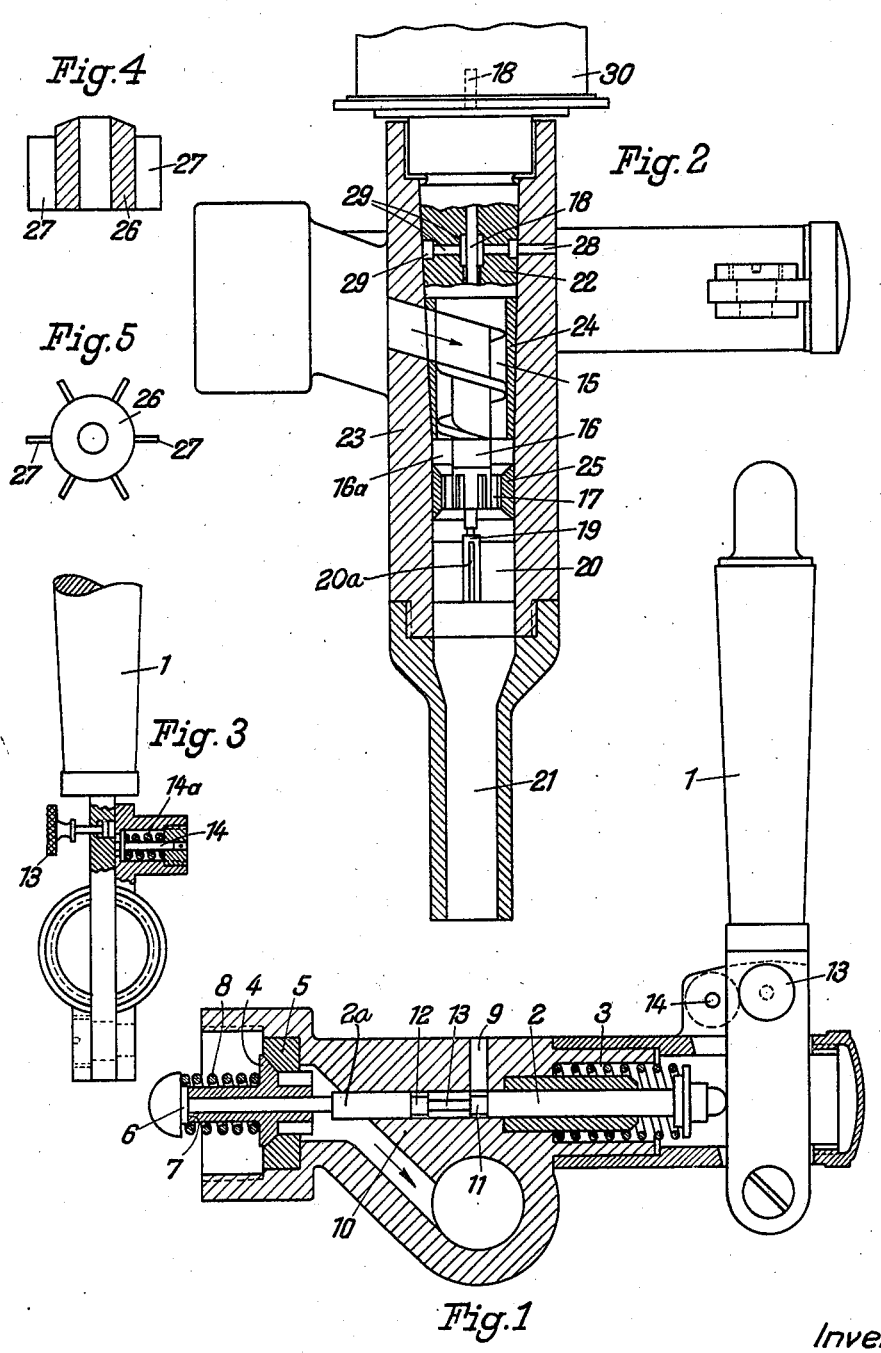

2,146,827

UNITED STATES PATENT OFFICE 2,146,827

LIQUID FLOW METER

Friedrich Kruspi, Berlin-Wilmersdorf, Germany

Application June 16, 1937, Serial No. 148,486
In Germany February 8, 1936

12 Claims. (Cl. 73—198)

The present invention relates to liquid flow meters of the kind which measure small quantities of liquids as for instance meters used in public house bars and tap-rooms for obtaining measured quantities of liquids, and in which the liquid flows through a helically shaped delivery conduit to drive a measuring wheel, the conduit from the liquid supply being opened or closed by a conical valve.

Although various constructions of instruments for measuring the flow of a liquid are known, the demand for a reliable instrument for measuring small quantities of liquids, particularly in the hostelry business, has not up to the present been satisfied.

Apart from the fact that these known constructions operate according to the principle of impulse or pressure turbines, they possess a number of serious drawbacks because the operation thereof is based on employing pressure energy by adapting directly the principle of the turbine to liquid measuring apparatus of the kind referred to and consequently the cross-sections of the supply conduit and the measuring wheel are made extremely small. The disadvantages of this construction are, in particular, first a marked dependence of the quantity of liquid delivered upon the pressure at the particular moment under which the liquid is supplied to the measuring instrument; secondly, with those liquids which, like beer, are delivered under the pressure of the carbonic acid gas, a considerable froth formation requires a repeated filling up of the glass or other receptacle; thirdly, liquid rises into the interior of the apparatus and sometimes into the metering mechanism located at the top thereof with the result that these parts become soiled; finally the speed at which the apparatus delivers the liquid is slow and no longer satisfies present-day requirements.

On the other hand, the selection of the cut-off member has, in conjunction with the forms of the delivery conduit and the measuring wheel, an outstanding influence upon the satisfactory working of liquid meters of the kind referred to. If, for example, as is the case with the apparatus in an ordinary bar of a restaurant, the liquid supply is controlled by a cock plug, the opening of the cock may be so small that, the measuring wheel is not sufficiently impelled and quantities of liquid which are not metered may be taken from the apparatus. In addition the metering mechanism located at the top of the apparatus must be turned with each opening and closing of the tap through 90° which movement in itself is extremely irksome. These defects have been removed by using as the cut-off member, a valve, which, contrary to a tap plug can be opened to large cross-sections by comparatively small movements. Simultaneously with the removal of these defects, however, it becomes extremely difficult to provide a supply of air in such a manner that when the valve is open any leakage of liquid through the air supply device is prevented, while, when the valve is closed, sufficient air is allowed to enter into the interior of the housing in order to effect a rapid delivery of the liquid then in the apparatus.

It is the object of the present invention to provide a measuring apparatus satisfying practical requirements and in which both the defects arising from the hitherto known construction of the delivery conduit and the measuring wheel and also the defects which hitherto prevented the use of a valve as the cut-off member, are avoided, both groups of defects, as already mentioned, being directly connected with each other.

According to the present invention, in a liquid flow meter of the kind hereinbefore referred to, the helical supply conduit comprises at least one convolution and has a constant cross-section throughout its whole length. The function of the helical conduit is to impart to the liquid a uniformly rapid rotating movement so as to convert completely the pressure energy into kinetic energy.

In order to avoid a constriction in the liquid current between the outlet of the liquid from the supply conduit and the inlet into the measuring wheel, which construction would cause an unwanted increase of pressure, it is desirable to leave between the members mentioned an intermediate space in which the liquid can freely rotate about the axis of the helix. In order to guide the liquid the core of the supply conduit is correspondingly lengthened. The final dimensions of this intermediate space and consequently of the guide of the spindle of the measuring wheel is determined by the necessity of the absence of pressure in the said space. A partial deflection of the direction of flow from the tangential into the axial direction takes place in the intermediate space with a corresponding variation in velocity. There is no liquid pressure in the intermediate space when the product of the mean velocity of the liquid in the supply conduit and its cross-section is equal to the product of the axial component of the velocity in the intermediate space and its cross-section perpendicular to the axis. If now the latter product is smaller than the former, a supplementary pressure arises in the intermediate space and causes the liquid to rise in the guide part or bearing of the measuring wheel spindle, that is, the axial component of the velocity has become greater than the outflow velocity from the supply conduit and consequently a portion of the kinetic energy is converted into pressure energy. If the said latter product is, on the contrary, greater than the said former product, a partial vacuum or decreased pressure is produced for similar reasons and consequently air is sucked in through an air intake device fitted, according to a feature of the invention on the spindle guide, thereby preventing any possible penetration of the liquid which is being measured, into the spindle guide. By the entry of air as a result of the vacuum, an absence of pressure in front of the measuring wheel is ensured whereby the whole apparatus is able to operate entirely without leakage and independently of the pressure under which the liquid is delivered to the apparatus.

In contrast to the known constructions, the present invention provides a measuring wheel having plane blades of contant area since the wheel has simply to be carried or driven by the tangential velocity of the liquid, without friction and as far as possible without mass. This measuring wheel consequently consists of a simple boss which carries one or more blades fixed radially and with their faces parallel to the axis of the wheel, and the wheel is so mounted in the current of the liquid that it is swept axially thereby and at the same time all the blades are impulsed uniformly and in the same direction of rotation by the tangential velocity component of the liquid current. The measuring wheel thus presents a comparatively large cross-section between the individual blades and thereby prevents any conversion of kinetic energy into pressure energy and simply accompanies the rotary movement of the rotating liquid current.

In order, however, to obviate non-effective marginal currents which take place along the walls in consequence of the clearance which the measuring wheel must have in order to work without friction, according to a further feature of the present invention, a conical deflecting ring is provided around the circumference of the measuring wheel and serves the purpose of directing these marginal currents into the measuring wheel. In this way complete absence of slip is attained.

The most favourable distance between the end of the guide conduit and the upper edge of the measuring wheel can be found by calculation only with difficulty, but it can be easily found for each liquid in practice by means of the air intake arrangement associated with the spindle guide. For beer and other liquids containing carbonic acid the vacuum obtained in the intermediate space by the suitable dimensioning thereof, has the advantage that it further reduces the froth formation whereby the construction and arrangement of the supply conduit and measuring wheel as hereinbefore described becomes extremely small.

The whole apparatus constructed according to the invention enables the kinetic energy of the uniformly rotating liquid to act on the measuring wheel, thereby avoiding any additional pressure energy. Above all, the arrangement permits the control of the mutual dependence of the pressure, the outflow velocity and the speed of rotation of the measuring wheel on the one hand and the areas of the supply conduit and measuring wheel, the length of the delivery conduit and the distance between measuring wheel and supply conduit on the other hand, and the apparatus may be adapted to any desired conditions by varying the latter mentioned factors.

In order to ensure that the above described measuring apparatus is constantly impulsed to a sufficient degree and to be able to use a valve as the cut-off member, according to a further feature of the present invention, the apparatus is provided with a supply of air by the actuation of the spindle of the valve, which is provided with transverse and longitudinal channels, which, when the valve is closed establish connection between the liquid supply conduit and air intake bores in the housing and in this way permit the entry of air. The valve spindle is not rigidly connected with the valve cone but is slidably mounted therein. The spindle is provided with a stop so that the valve is opened after a short lost movement of the spindle during which the air intake bores in the casing are closed. In order to ensure that the whole apparatus is reliably closed when this air supply arrangement is in the closed condition there is provided, according to another feature of the invention, a member having a sealing surface at the end of the valve spindle which member in the unoperated condition of the apparatus forms a tight joint with the spindle guide of the valve cone. This member is at the same time constructed so as to carry a spring which forces the valve cone on to its seat, a feature which is important when the measuring apparatus according to the present invention is to be used for drawing off liquids which are not under supplementary drawing off pressure.

In order that the invention may be clearly understood a description will be given in conjunction with the accompanying drawings, which show, by way of example, one embodiment of the invention.

In the construction shown in the drawings for the actuation of the valve a lever having a single arm and with direct action upon the valve spindle is employed and is provided with an automatically acting locking device which secures the lever in the open position. The release of the locking device is, in the practical embodiment of the invention, only possible by an additional movement of the valve in the opening direction. A positive actuation of the apparatus is produced and the whole valve spindle is under the action of a spring in known manner, the said spring being stronger than the valve spring and in the unoperated position draws the valve cone as well as the supplementary tight joint device constantly into the closed position.

Referring to the drawing:

Figure 1 illustrates a partial cross-section of the apparatus taken in a plane through the axis of the valve spindle;

Figure 2 illustrates a partial longitudinal section through the axis of the measuring wheel spindle;

Figure 3 illustrates a partial section through the locking device of the actuating lever; and Figures 4 and 5 illustrate the measuring wheel in sectional elevation and plan respectively.

Referring to Figure 1, a valve spindle 2 loaded by the spring 3 is actuated by a lever 1. The pressure of the spring 3 on the valve spindle 2 draws a valve cone 4 on to a seat 5 therefor and also a sealing member 6 on the head 7 of a spindle guide, while at the same time a spring 8 is compressed. Upon moving the lever 1 to the left-hand side of Figure 1, the valve cone 4 at first remains closed since the spring 8 keeps the valve cone 4 in which the spindle 2 is movable, on to the valve seat 5 until a stop 2a on the spindle 2 carries forward the valve cone 4 with it. In this way a short free relative movement of the valve spindle 2 with respect to the valve cone 4 is obtained which movement is necessary in order to close conduits 9 and 10 before the opening of the valve. Through these conduits air is supplied to the interior of the apparatus when in the unoperated position in order to rapidly discharge the liquid remaining in the apparatus at the end of an operation. When the valve 4 is open, the spindle 2 having moved to the left-hand side of Figure 1, the two conduits 9 and 10 are covered by the spindle 2. There are two sealing parts of the spindle, separated by two annular grooves 11 and 12 which are connected by a longitudinal groove 13. With this construction an unusually good seal is attained. With the return movement of the spindle 2 the valve cone 4 is closed first, after which the annular grooves 11 and 12 register with the conduits 9 and 10 and effect the entry of air.

In order to avoid the possibility of an insufficient action on the measuring wheel when the valve cone 4 opens, the lever 1, on the opening of the valve is secured in its open position by an automatically acting locking device as shown in Figure 3, which device can only be released by the operation of a push knob 13 when an additional movement in the opening direction is given to the lever 1. The locking device operates by means of the pin 14 which is inserted in a corresponding recess in the lever 1 by the pressure of a spring 14a and secures the lever as soon as this recess and the pin 14 are opposite each other. When the pin 14 enters into the recess in the lever 1, the push knob 13 is correspondingly pushed out. On releasing the locking device by pressing back the pin 14 by means of the push knob 13 or upon releasing one's hold upon the lever 1 before it is secured by the locking means, the force of the spring 3 automatically closes the valve 4 while at the same time the spring 8 is compressed. The apparatus can also be conveniently kept constantly open by means of this locking device.

After passing through the valve, the liquid enters a delivery conduit 15 and flows in the direction of the arrows in Figures 1 and 2, through this conduit and then circulates in the intermediate space 16a, around the extension 16 of the core of the delivery conduit 15 to come finally into a measuring wheel 17 which in consequence of the rotational velocity of the fluid is set in rotary movement. As shown in Fig. 2, the supply conduit enters sidewise into casing 23 at an inclination according to the pitch of the helical conduit 15. Space 16a permits the liquid to make free rotation before entering into the measuring wheel. After leaving the measuring wheel 17 the liquid passes into a chamber 20 the cylindrical space of which is subdivided by four radial and axial partitions 20a into four sections, and from this space the liquid flows to a delivery spout 21 of the apparatus.

The spindle 18 of the measuring wheel 17 has its lower bearing at 19 in the chamber 20. In order to obtain a better joint, a conical bush 24 (Figure 2) which surrounds the supply conduit 15, is fitted into the housing 23 and in order to retain in the supply conduit 15 an area of cross-section which is constant over the entire length thereof. The conical bush 24 is formed upon the lower part of a bearing member 22, and this bush 24 is bored cylindrically to fit the core carrying the supply conduit 15. The bush 24 together with the upper part of the member 22 provides a conical sealing surface with the housing 23 until the member 22 merges further up into a cylindrical shape. The bush 24 has an aperture appropriately located to allow the liquid to enter the delivery conduit 15 through the housing 23 as clearly shown in Figure 2.

In order to make the marginal currents effective for the measuring wheel and to prevent any slip of quantities of liquid not measured, the measuring wheel 17 is located in a sealing ring 25 which is bevelled at the top and, if necessary, also at the bottom. This ring 25 reduces the area of flow of liquid in front of the measuring wheel. A boss 26 (Figure 4) of the measuring wheel 17 is provided with a conical end which bears in the extension 16 of the core of the member 22 and which carries the delivery conduit 15.

In order to permit the suction of air by the vacuum which arises between the lower edge of the delivery conduit 15 and the upper edge of the measuring wheel 17, the bearing of the spindle 18 is provided inside the member 22 with circumferential air intake ducts or conduits 29 which communicate with the air duct or bore 28 in the housing 23. The vacuum positively prevents any inlet of the liquid into the bearing of the spindle 18 in the member 22.

The boss 26 (Figure 4) of the measuring wheel, has the upper end surface thereof as already stated, made conical for extending into the extension 16 of the core of the delivery conduit 15, and carries one or more blades 27 (Figures 4 and 5).

The member 22 has at its end a registering mechanism enclosed by the cap 30 (Figure 2), the rotary movement of the measuring wheel spindle 18 being in known manner transmitted to the registering mechanism by toothed wheels.

Having now particularly described and ascertained the nature of my said invention and in what manner the same is to be performed, I declare that what I claim is:—

1. A liquid flow meter comprising in combination an outer casing, liquid inlet supply and outlet delivery conduits in said casing, a stationary helically shaped conduit consisting of at least one full convolution and having a constant cross-section throughout the whole length thereof disposed between and in communication with said inlet and outlet conduits, a measuring wheel arranged between the said helical conduit and the outlet conduit and so located as to leave an intermediate space between the end of the helical conduit and the wheel, said space being of such a size as to permit of the liquid making a free rotation before entering into the measuring wheel and so dimensioned that a partial vacuum is created therein by the flow of liquid therethrough.

2. A liquid flow meter comprising in combination an outer casing, liquid inlet supply and outlet delivery conduits in said casing, a helically shaped conduit consisting of at least one convolution and having a constant cross-section throughout the whole length thereof disposed between and in communication with said inlet and outlet conduits, a measuring wheel arranged between the said helical conduit and the outlet conduit and so located as to leave an intermediate space between the end of the helical conduit and the wheel, said space being of such a size as to permit of the liquid making a free rotation before entering into the measuring wheel and so dimensioned that a partial vacuum is created therein by the flow of liquid therethrough, and air ducts placing the bearing of the measuring wheel spindle into communication with the atmosphere.

3. A liquid flow meter comprising in combination an outer casing, liquid inlet supply and outlet delivery conduits in said casing, a stationary helically shaped conduit consisting of at least one convolution and having a constant cross-section throughout the whole length thereof disposed between and in communication with said inlet and outlet conduits, a measuring wheel coaxially arranged between the said helical conduit and the outlet conduit, said measuring wheel consisting of a simple boss carrying at least one radial blade the face of which is arranged parallel to the axis of said boss and located so as to be impinged upon by the tangential component of the liquid current.

4. A liquid flow meter comprising in combination an outer casing, liquid inlet supply and outlet delivery conduits in said casing, a helically shaped conduit consisting of at least one convolution and having a constant cross-section throughout the whole length thereof disposed between and in communication with said inlet and outlet conduits, a measuring wheel arranged between the said helical conduit and the outlet conduit and so located as to leave an intermediate space between the end of the helical conduit and the wheel, said space being of such a size as to permit of the liquid making a free rotation before entering into the measuring wheel and having a larger diameter than said wheel, and a conical ring arranged coaxially to said wheel so as to reduce the area of flow of the liquid in front of said wheel.

5. A liquid flow meter comprising in combination an outer casing, liquid inlet supply and outlet delivery conduits in said casing, a helically shaped conduit consisting of at least one convolution and having a constant cross-section throughout the whole length thereof disposed between and in communication with said inlet and outlet conduits, a measuring wheel arranged between the said helical conduit and the outlet conduit, a valve disposed to close and open said inlet conduit, said valve having a valve disc, an operating spindle and a spring between said disc and said spindle so arranged as to allow said spindle a lost motion relatively to said disc during which said disc is held in closed position by said spring, air ducts disposed for supplying air into said casing in order to discharge remaining liquid at the end of each operation, and a valve controlling said air ducts operatively connected with said spindle so as to be actuated during said relative movement to open said duct.

6. A liquid flow meter comprising in combination an outer casing, liquid inlet supply and outlet delivery conduits in said casing, a helically shaped conduit consisting of at least one convolution and having a constant cross-section throughout the whole length thereof disposed between and in communication with said inlet and outlet conduits, a measuring wheel arranged between the said helical conduit and the outlet conduit and so located as to leave an intermediate space between the end of the helical conduit and the wheel, said space being of such a size as to permit of the liquid making a free rotation before entering into the measuring wheel and so dimensioned that a partial vacuum is created therein by the flow of liquid therethrough, air ducts connecting the atmosphere with the interior of said casing in order to discharge remaining liquid from said casing at the end of the operation, a valve in said inlet conduit disposed to close and open said inlet conduit, and a spindle coupled with said valve for operating said valve, said spindle being provided with two communicating circumferential channels, said air ducts and said spindle being arranged so that the air passage formed by said ducts is closed by said spindle and is opened only when said channels are in registry with said ducts.

7. A liquid flow meter comprising in combination an outer casing, liquid inlet supply and outlet delivery conduits in said casing, a helically shaped conduit consisting of at least one convolution and having a constant cross-section throughout the whole length thereof disposed between and in communication with said inlet and outlet conduits, a measuring wheel arranged between the said helical conduit and the outlet conduit, a valve arranged in said inlet conduit, said valve having a valve disc, an operating spindle passing through a boring of said disc, a sealing body on the end of said spindle adapted to contact said disc, and a spring, said disc and said spindle being disposed to allow said spindle a lost motion relatively to said disc during which said disc is held in valve closing position by said spring, ducts for supplying air into said casing in order to discharge remaining liquid at the end of the operation, a valve controlling said ducts, and common means for operating said two valves, said means comprising a spring tending to maintain said first-mentioned valve in closed position and to hold said sealing body against said disc in counteraction to said first-mentioned spring.

8. A liquid flow meter comprising in combination an outer casing, liquid inlet supply and outlet delivery conduits in said casing, a helically shaped conduit consisting of at least one convolution and having a constant cross-section throughout the whole length thereof disposed between and in communication with said inlet and outlet conduits, a measuring wheel arranged between the said helical conduit and the outlet conduit, a valve disposed to control said inlet conduit, an air conduit for supplying air in order to discharge remaining liquid at the end of each operation, an air control valve arranged within said air conduit, and means operatively connected with said two valves for actuating said valves in dependency on each other.

9. A liquid flow meter comprising in combination an outer casing, liquid inlet supply and outlet delivery conduits in said casing, a helically shaped conduit consisting of at least one convolution and having a constant cross section throughout the whole length thereof disposed between and in communication with said inlet and outlet conduits, a measuring wheel arranged between the said helical conduit and the outlet conduit, a valve disposed to control said inlet conduit, a duct connecting said inlet supply conduit with the outside for supplying air to said inlet supply conduit, said duct entering into said inlet supply conduit between said valve and said helical conduit, means connected with said valve for controlling said air duct so as to open said duct when said valve is in closing position, a handle for operating said valve and said control means, a spring biasing said handle and tending to hold said handle in valve-closing position, a locking device for maintaining said handle in valve-opening position against the action of said spring, and means for releasing said locking device.

10. A liquid flow meter comprising in combination a tubular casing, a delivery spout disposed at the lower end of said casing, a helical conduit arranged in the upper portion of said casing coaxially to said casing and said spout, a supply conduit entering sidewise into said casing and having near said casing an inclination according to the pitch of said helical conduit so as to be in alignment with the entrance portion of said helical conduit, and a measuring wheel coaxially arranged in said casing between said helical conduit and said spout, said wheel having radial impeller blades designed to react only on the tangential component of the liquid movement so that the rotation of said wheel is independent of the liquid pressure acting in the axial flow direction.

11. A liquid flow meter comprising a casing, a delivery spout forming the lower portion of said casing, a helical conduit having a constant cross section throughout its whole length arranged in the upper portion of said casing and designed to impart a rotation to the liquid flowing therethrough, a supply conduit entering sidewise into said casing so as to be in alignment with said helical conduit, a measuring wheel arranged coaxially to said helical conduit between said helical conduit and said spout so as to leave an intermediate space between said helical conduit and said wheel for permitting the liquid to freely rotate before entering into said wheel, said wheel having radial impeller blades so as to react upon the tangential component of the liquid current independent of its axial component.

12. A liquid flow meter comprising a casing, a delivery spout forming the lower portion of said casing, a helical conduit arranged in the upper portion of said casing for imparting a rotation to the liquid flowing therethrough, a supply conduit entering sidewise into said casing in alignment with said helical conduit, a control valve disposed in said supply conduit, a measuring wheel arranged coaxially to said helical conduit between said helical conduit and said spout so as to leave an intermediate space between said helical conduit and said wheel for causing a vacuum to be produced by the liquid flowing through said space, an air duct connected with said supply conduit between said valve and said helical conduit, means for controlling said air duct, an operating member connected with said valve and said control means so as to open said duct when closing said valve, whereby the vacuum produced in said intermediate space causes air to be drawn through said duct into said helical conduit upon closing of said valve so as to rapidly discharge residual liquid.

FRIEDRICH KRUSPI.